United States Patent [19]

Littwin

[11] 3,769,565
[45] Oct. 30, 1973

[54] VOLTAGE CONTROL
[75] Inventor: Arthur K. Littwin, Lincolnwood, Ill.
[73] Assignee: Littwin Family Trust No. 1, Chicago, Ill.
[22] Filed: Feb. 22, 1971
[21] Appl. No.: 117,764

Related U.S. Application Data
[63] Continuation of Ser. No. 725,698, May 1, 1968, abandoned.

[52] U.S. Cl. ............................................. 318/380
[51] Int. Cl. ........................................... H02p 3/12
[58] Field of Search ......... 318/279–381; 322/12–14; 317/13, 19, 31

[56] References Cited
UNITED STATES PATENTS

| | | | |
|---|---|---|---|
| 3,247,447 | 4/1966 | Flairty | 321/14 |
| 3,253,189 | 5/1966 | Wouk | 317/31 |
| 3,129,374 | 4/1964 | Relation et al. | 321/14 |
| 3,371,262 | 2/1968 | Bird et al. | 321/14 |
| 3,371,259 | 2/1968 | James et al. | 318/380 |
| 3,188,547 | 6/1965 | Zelina | 318/380 X |
| 3,227,938 | 1/1966 | Draxler | 318/380 X |

*Primary Examiner*—Bernard A. Gilheany
*Assistant Examiner*—W. E. Duncanson, Jr.
*Attorney*—Paul H. Gallagher

[57] ABSTRACT

Voltage control circuit having a DC motor, and including other instrumentalities, such as a rectifier, subject to damage by excessive emf as in braking, and means controlled by the counter emf for actuating relays which control resistances and correspondingly control a valve (tube) for opening circuit to the rectifier and thereby cutting it out of the circuit from the counter emf.

1 Claim, 3 Drawing Figures

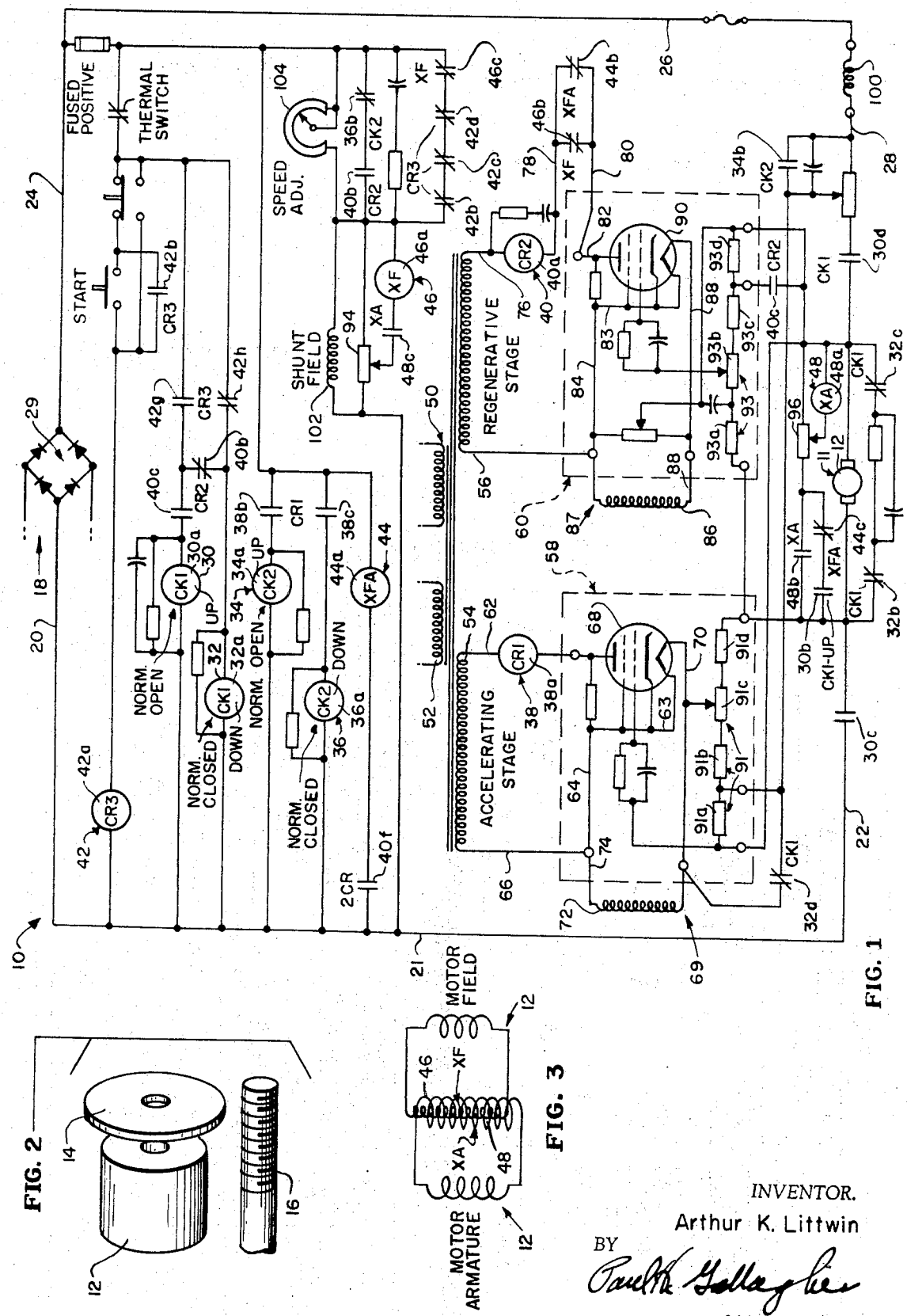

VOLTAGE CONTROL

This is a continuation of application Ser. No. 725,698, filed May 1, 1968 now abandoned.

OBJECTS OF THE INVENTION

The invention resides in the field utilizing a DC motor for performing various operations; when it is desired to brake the motor the voltage thereof is utilized for the purpose, but in cases where the braking operation is of great magnitude the voltages involved are of great value, often resulting in damage to other instrumentalities used in the circuit with the motor. A similar situation occurs in accelerating the speed of the motor, i.e., the back voltages involved being of such value that steps must be taken to prevent damage therefrom.

A broad object of the invention is to provide in an electrical apparatus utilizing a DC motor in the manner referred to above, means controlled by the armature voltage for cutting out from the circuit other instrumentalities that are vulnerable to damage by that voltage.

Another object is to provide apparatus of the character just referred to in which the means for cutting out the instrumentalities includes relays for opening the circuit to the instrumentalities.

Still another object is to provide in apparatus of the kind just referred to an arrangement of counteracting relays whereby to facilitate adjustment thereof and to facilitate predetermination of points of control relative to values of voltage.

DESCRIPTION OF A PREFERRED EMBODIMENT

In the drawings:

FIG. 1 is a diagram of the electrical circuit utilized in the apparatus;

FIG. 2 is a semi-diagrammatic fragmentary view of certain elements of an apparatus in connection with which the circuit is used; and FIG. 3 is a detail of a relay component utilized in the electrical circuit.

The main circuit as shown in FIG. 1, indicated at 10 includes a DC motor-generator unit 11 (bottom center) for performing a working operation, and including a motor 12, which in FIG. 2 is arranged for driving a grinding wheel 14 utilized for forming and dressing threads on a member 16. The grinding wheel 14 and the object member 16 are of course only examples of applications of the invention, the principal feature of the invention including the control of the DC motor.

The circuit 10 includes a DC source indicated generally at 18 and having on one side conductors 20, 21, 22 leading to the motor 12, and on the other side conductors 24, 26, 28 leading to the motor. The source may be of a character desired, the present disclosure including a rectifier 29 as an example of such, and an instrumentality to be protected.

The circuit includes a number of relays referred to variously hereinbelow and for convenience all of them are identified at this point, these being 30, 32, 34, 36 (right center) 38 (left center) 40 (upper center) 42 (left top) 44 (left center) 46 (upper center) and 48 (bottom center). The coils of the various relays are identified with the respective reference numerals and the subscript *a* while the various contacts are identified by the respective reference numerals and subscripts *b*, *c*, *d*, etc.

The particular application of the invention disclosed herein involves a machine tool having a grinding wheel for grinding threads on a workpiece. The threads are ground by means of the grinding wheel 14, identified above, driven by the motor 12. In a first step of the overall operation, the threads are ground by the wheel, the wheel in this case traveling at a high speed such for example 3,000 rpm and then the threads are dressed by the wheel but at a much lower rate of speed, such for example as 700 rpm. This reduction in speed must be accomplished within a period of two seconds. It will be understood the invention is applicable to operations of a wide variety of characters and is not limited to the specific example referred to herein, etiher as to the kind of end product being produced, or the particular speeds involved, or the time in which the speed is reduced in the manner stated, and in fact it is applicable to a reverse situation in which the speed is increased.

The circuit also includes an AC portion, including a transformer 50 having a primary 52 connected with any suitable source and secondaries 54, 56. The secondaries 54, 56 are respectively operatively associated with subcircuit components namely an accelerating stage 58 and a regenerative stage 60.

Referring to the accelerating stage 58, leading at one end from the secondary 54 is a conductor 62 which includes the relay 38 and connects with a conductor 64 and through a conductor 66 returning to the secondary. The conductor 62 also leads to the anode of a tube 68, the cathode of which is connected with a conductor 70 leading to a secondary 72 of a transformer deriving its power from any suitable source. Leading from the other end of the secondary is a conductor 74 in turn leading to both conductors 64, 66.

A similar arrangement is utilized in connection with the regenerative stage 60; leading from one end of the secondary 56 is a conductor 76 which in turn leads to the relay 40 which at its opposite end is connected with a conductor 78; the conductor 78 is connected through two sets of normally closed contacts 44*b*, 46*b* to another conductor 80 which in turn leads to a conductor 82. The latter conductor 82 is connected with a conductor 84 leading to a secondary 86 of a transformer deriving its power from any suitable source. Leading from the other end of the secondary 86 is another conductor 88 leading to the cathode of a tube 90. The anode of the tube 90 is connected with the conductor 82.

The motor 12 of known kind, has a low armature resistance and acts as a suppressor and dynamic brake when full voltage is applied to the motor during the braking cycle. High counter voltage is developed, and intensive arc-ing is produced at the motor brushes and commutator and in many instances it flashes over. The regenerative stage 60 is provided for preventing excessive voltage from backing up in the circuit to any other instrumentality that is vulnerable, such as the rectifier means 29 usually provided for producing the desired DC in the motor.

The relays 30, 32, 34, 36 are provided as standard elements, such as in the grinder to which the invention is applied, and need not be described in detail, it being sufficient to state that these relays control such movements as putting the grinder into motion, moving up or down, and operating at high speed or at low speed, these functions being standard and well known. The invention is applicable for the purpose stated in connection with these various functions of the machine, as well as for example in connection with increasing the speed of the motor, where excessive armature voltages are encountered, for preventing damage to other instrumentalities.

In the machine as herein disclosed, assume for example that a grinding operation is being performed, and the grinding wheel 14 (FIG. 2) is operated in the manner referred to above, namely it is rotating at a speed of for example 3,000 rpm; at the end of the grinding operation it is reduced in speed to 700 rpm in two seconds, for performing a dressing operation. To accomplish this, the relay 44 (left center) is energized by the operational program of the machine and this relay, acting through the contacts 44b, (right lower) de-energizes the relay 40 (right center); the latter acting through the contacts 40cde-energizes the relay 30 and opens the contacts 30c (bottom left) and 30d (bottom left); at this time the contacts 32b, 32c (bottom center) remain closed, establishing a circuit through the armature of the motor for performing the braking operation.

The coils 46 (right center) and 48 (bottom center) are incorporated in a single unit in opposed or counteracting relation, as represented in FIG. 3, and are controlled as to effectiveness based on value of the affecting current by adjustable resistors 94, 96 respectively. The relay 48 is connected in a series circuit with the armature of the motor 12, and the relay 46 is connected across the DC circuit. As the motor armature decreases in speed, the power of the coil 48a is reduced, and effectively de-energized, opening the contacts 48c (right center) at a point depending upon setting of the resistors 94, 96. The relay 48 is connected so as to be responsive to the voltage of the motor armature, while the relay 46 is connected so as to be responsive to the voltage of the field of the motor. The circuit includes a series field 100 (bottom right) in series with the armature of the motor; a shunt field 102 (upper right) in series with the speed adjusting rheostat 104; the adjustable resistor 94 and the relay 46 being connected in parallel with the shunt field 102 and speed adjusting rheostat 104.

Upon de-energization of the relay 48, the contacts 48c (right center) again are opened, de-energizing relay 46, enabling the contacts 46b (lower right) to close, which energizes the relay 40 once again. Consequently the dynamic braking circuit is opened by the contacts 32b, 32c (bottom center, which are then open and the circuit through the armature is again closed through the contacts 30c bottom left and 30d bottom right. In this condition full line voltage is applied to the motor armature and through the normally closed contacts 46b full field strength is applied by shorting out the field rheostat 104 through the normally closed contacts of the relay 42 top left.

In this condition of the circuit and operating function of the motor, the dressing operation is performed and upon completion of that operation, the relay 44 left center is de-energized by an inherent function of the grinding machine which need not be described herein. Upon de-energization of this relay, the normally closed contacts 44b lower right retain relay 40 in energized condition, which acting through contacts 40c upper center energizes relay 30, allowing contacts 30b bottom center to close and through those contacts and associated contacts 44c energizing relay 48 and the latter acting through the contacts 38c upper center which are then closed energizes the relay 46. Energization of the relay 48 closes the contacts 48c, (energizing the relay 46 as stated) and opening the contacts 46c which had been shorting the rheostat 104. The rheostat is then put into circuit and the motor is accelerated to the predetermined setting of that field rheostat which is higher than the base speed. Thus a cycle has been completed and the circuit is in condition for another grinding operation.

The voltage developed by the motor armature is utilized in controlling other parts of the circuit from adverse effects of that voltage, through the use of relays, namely 40, 46, 48, and cutting out from the circuit the windings 100, 102, and preventing the voltage from backing up through the circuit to other instrumentalities such as the rectifier 29 as stated.

I claim:

1. Voltage control apparatus in conjunction with a machine having
    a work member and a DC motor for driving it,
    an electrical circuit including controls for controlling the machine, and including the motor and means for braking the motor,
    the circuit also including a rectifier representing an instrumentability subject to damage by the counter emf developed in braking the motor,
    same voltage control apparatus comprising
    the controls of the machine including a first relay, and the apparatus including normally open contacts of that relay, in series with the motor and the rectifier,
    second subcircuit including a second relay controlling the first relay, and when energized retaining the first relay energized,
    a subcircuit including the second relay and including a valve,
    resistance means operative for imposing a negative bias on the valve to render it non-conducting,
    the second relay including normally open contacts operative when closed for shorting out a portion of the resistances and the remaining resistances being insufficient to render the valve non-conducting,
    the motor being operative in response to development of a predetermined value of counter emf, for driving sufficient current through the remaining resistances and render the valve non-conducting, and thereby open the circuit to the second relay and de-energize the latter and open the said contacts of that relay and thereby put all of the resistances in circuit with the relay until that current lowers to a predetermined value,
    the second relay being operative for de-energizing the first relay, and thereby opening the first contacts between the motor and the rectifier, while the counter emf is above a predetermined value.

* * * * *